United States Patent
Song et al.

(10) Patent No.: US 8,684,329 B2
(45) Date of Patent: Apr. 1, 2014

(54) SOLENOID VALVE FOR LIQUID PROPANE INJECTION SYSTEM

(75) Inventors: Jutae Song, Suwon-si (KR); Yeounkwan Sung, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 231 days.

(21) Appl. No.: 13/247,874

(22) Filed: Sep. 28, 2011

(65) Prior Publication Data

US 2012/0138829 A1  Jun. 7, 2012

(30) Foreign Application Priority Data

Dec. 6, 2010 (KR) .................. 10-2010-0123860

(51) Int. Cl.
*F16K 31/06* (2006.01)
*H01F 7/128* (2006.01)

(52) U.S. Cl.
USPC ............................ 251/129.15; 335/260

(58) Field of Classification Search
USPC ............. 251/129.15; 137/454.5; 62/50.7; 335/260
See application file for complete search history.

(56) References Cited

U.S. PATENT DOCUMENTS

| | | | | |
|---|---|---|---|---|
| 3,339,577 A | * | 9/1967 | Teegarden | 137/375 |
| 4,846,440 A | * | 7/1989 | Carlson et al. | 251/129.17 |
| 5,020,774 A | * | 6/1991 | Christianson | 251/129.15 |
| 5,094,264 A | * | 3/1992 | Miller | 137/270 |
| 5,232,196 A | * | 8/1993 | Hutchings et al. | 251/129.08 |
| 5,709,370 A | * | 1/1998 | Kah, Jr. | 251/129.15 |
| 7,040,594 B2 | | 5/2006 | Hironaka | |
| 2007/0158603 A1 | * | 7/2007 | Vollmer et al. | 251/50 |
| 2009/0057588 A1 | * | 3/2009 | Reilly | 251/129.15 |

FOREIGN PATENT DOCUMENTS

| | | |
|---|---|---|
| JP | 58-121381 A | 7/1983 |
| JP | 2005-24077 A | 1/2005 |
| KR | 2003-0037283 A | 5/2003 |
| KR | 10-0933723 A | 12/2009 |
| KR | 10-2010-0032593 A | 3/2010 |

* cited by examiner

*Primary Examiner* — John Rivell
*Assistant Examiner* — Seth W Mackay-Smith
(74) *Attorney, Agent, or Firm* — Morgan, Lewis & Bockius LLP

(57) ABSTRACT

A solenoid valve for a liquid propane injection system can prevent bubbles from flowing into a fuel pump due to heat from a solenoid coil, when a vehicle that travels at low speed is instantaneously and rapidly accelerated, using a sealing member and a sealing-reinforcing member, and accordingly keep the vehicle stably traveling by maintaining the fuel-sending performance of the fuel pump and smoothly supplying fuel to injectors.

5 Claims, 6 Drawing Sheets

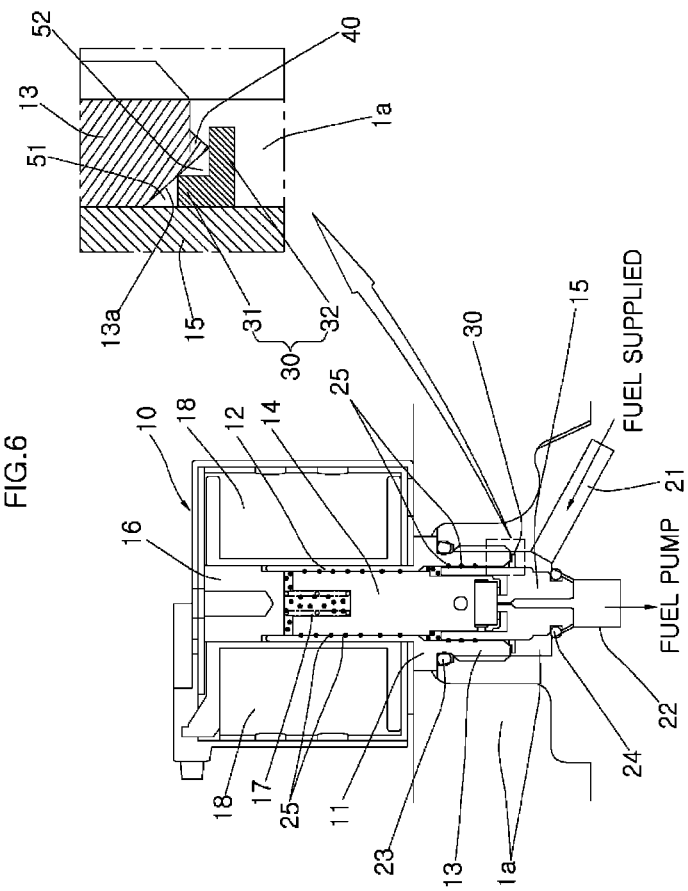

SOLENOID VALVE FOR LIQUID PROPANE INJECTION SYSTEM

CROSS-REFERENCE TO RELATED APPLICATIONS

The present application claims priority to Korean Patent Application Number 10-2010-0123860 filed Dec. 6, 2010, the entire contents of which application is incorporated herein for all purposes by this reference.

BACKGROUND OF INVENTION

1. Field of Invention

The present invention relates to a solenoid valve for a liquid propane injection system, and more particularly, to a solenoid valve for a liquid propane injection system that prevents bubbles from flowing into a fuel pump when a vehicle traveling at low speed is instantaneously and rapidly accelerated.

2. Description of Related Art

In general, as shown in FIG. 1, an LPI (Liquid Propane Injection) system is a system in which a fuel pump 2 pumps up liquid fuel stored in a bomb 1, the pumped fuel is injected into the combustion chambers of cylinders by injectors 3 through a pressure regulator, and the remaining fuel that fails to be injected into the combustion chamber by injectors 3 returns to bomb 1 through a return valve, and the system can improve the output and reduce the exhaust gas.

The fuel pump of the LPI system is usually disposed in the bomb and in this case it is not easy to maintain and repair the fuel pump, such that fuel pump 2 may be disposed outside bomb 1, as shown in FIG. 1.

In the LPI system with fuel pump 2 outside bomb 1, the fuel in bomb 1 flows through a solenoid valve 10 and then is supplied to fuel pump 2.

Solenoid valve 10, as shown in FIGS. 2 and 3, has a plunger housing 12 at one side from a tool-coupling portion 11 and a bomb-coupling portion 13 at the other side. A plunger 14 is inserted in plunger housing 12 and a pressure valve 15 is disposed in bomb-coupling portion 13, in which one end of pressure valve 15 is connected with plunger 14 and the other end is exposed to the outside through bomb-coupling portion 13.

In this structure, a thread is formed on the outer circumferential surface of bomb-coupling portion 13, such that bomb-coupling portion 13 is thread-fastened to a bomb housing 1a.

When bomb-coupling portion 13 is thread-fastened to bomb housing 1a, pressure valve 15 protruding through bomb-coupling portion 13 is positioned between a fuel intake port 21 and a fuel discharge port 22.

Further, in solenoid valve 10, an armature 16 is connected to plunger housing 12 and a spring 17 elastically supporting plunger 14 is disposed between plunger 14 and armature 16, such that armature 16 fixes a solenoid coil 18 wound on plunger housing 12.

Further, an O-ring 23 keeping bomb housing 1a hermetic is disposed between tool-coupling portion 11 and bomb-coupling portion 13 and an O-ring 24 keeping fuel discharge port 22 hermetic is disposed on the outer circumferential surface of the end of pressure valve 15.

Solenoid valve 10 having the configuration described above keeps open such that fuel supply port 21 and fuel discharge port 22 are connected, by receiving power from a battery when the engine starts.

However, bubbles 25 are produced by evaporation of the fuel in solenoid valve 10 that is operated by the power from the battery because the temperature of solenoid coil 18 that generates heat is higher than the temperature of the fuel, and bubbles 25 produced as described above remain in the gap between plunger housing 12 and plunger 14, as shown in FIG. 3.

Since the flow speed of the fuel is low when a vehicle travels at low speed, bubbles 25 keep remaining in the gap between plunger housing 12 and plunger 14 and do not flow into fuel pump 2, while the flow speed of the fuel rapidly increases when the vehicle that has traveled for a predetermined time at low speed is instantaneously accelerated, such that bubbles 25 flow into fuel pump 2 through fuel discharge port 22, as shown in FIG. 4.

As bubbles 25 flow into fuel pump 2, as described above, fuel pump 2 loses the function of instantaneously sending the fuel and fuel is not smoothly supplied to injectors 3, such that the traveling of the vehicle becomes unstable.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a solenoid valve for an LPI (Liquid Propane Injection) system that can prevent bubbles from flowing into a fuel pump due to heat from a solenoid coil, when a vehicle that travels at low speed is instantaneously and rapidly accelerated, and keep the vehicle stably traveling by maintaining the fuel-sending performance of the fuel pump.

Various aspects of the present invention provide for a solenoid valve for a liquid propane injection system, which includes a sealing member that is fitted on the outer circumferential surface of a pressure valve which is connected with a bomb-coupling portion to prevent connection between the gap, which is in between the bomb-coupling portion and the pressure valve, and the outside; and a sealing-reinforcing member that is integrally formed in contact with the sealing member at the end of the bomb-coupling portion which faces the sealing member in order to reinforce airtightness between the bomb-coupling portion and the sealing member.

The sealing member has an L-shaped cross-section constructed by a vertical portion and a horizontal portion, which are integrally connected and the sealing-reinforcing member has a triangular cross-section.

An upper edge of the vertical portion of the sealing member is in contact with an inner inclined surface provided at the end of the bomb-coupling portion, while the horizontal portion of the sealing member is in contact with the point of the sealing-reinforcing member.

The sealing member may be made of rubber and the sealing member may be an O-ring made of rubber and the sealing-reinforcing member may be made of the same material as the bomb-coupling portion.

According to various aspects of the present invention, it is possible to prevent bubbles from flowing into a fuel pump due to heat from a solenoid coil, when a vehicle that travels at low speed is instantaneously and rapidly accelerated, using the sealing member and the sealing-reinforcing member, and accordingly it is possible to keep the vehicle stably traveling by maintaining the fuel-sending performance of the fuel pump and smoothly supplying fuel to injectors.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a cross-sectional view showing when the exemplary solenoid valve according to the present invention is mounted in a bomb housing.

Figure 1:
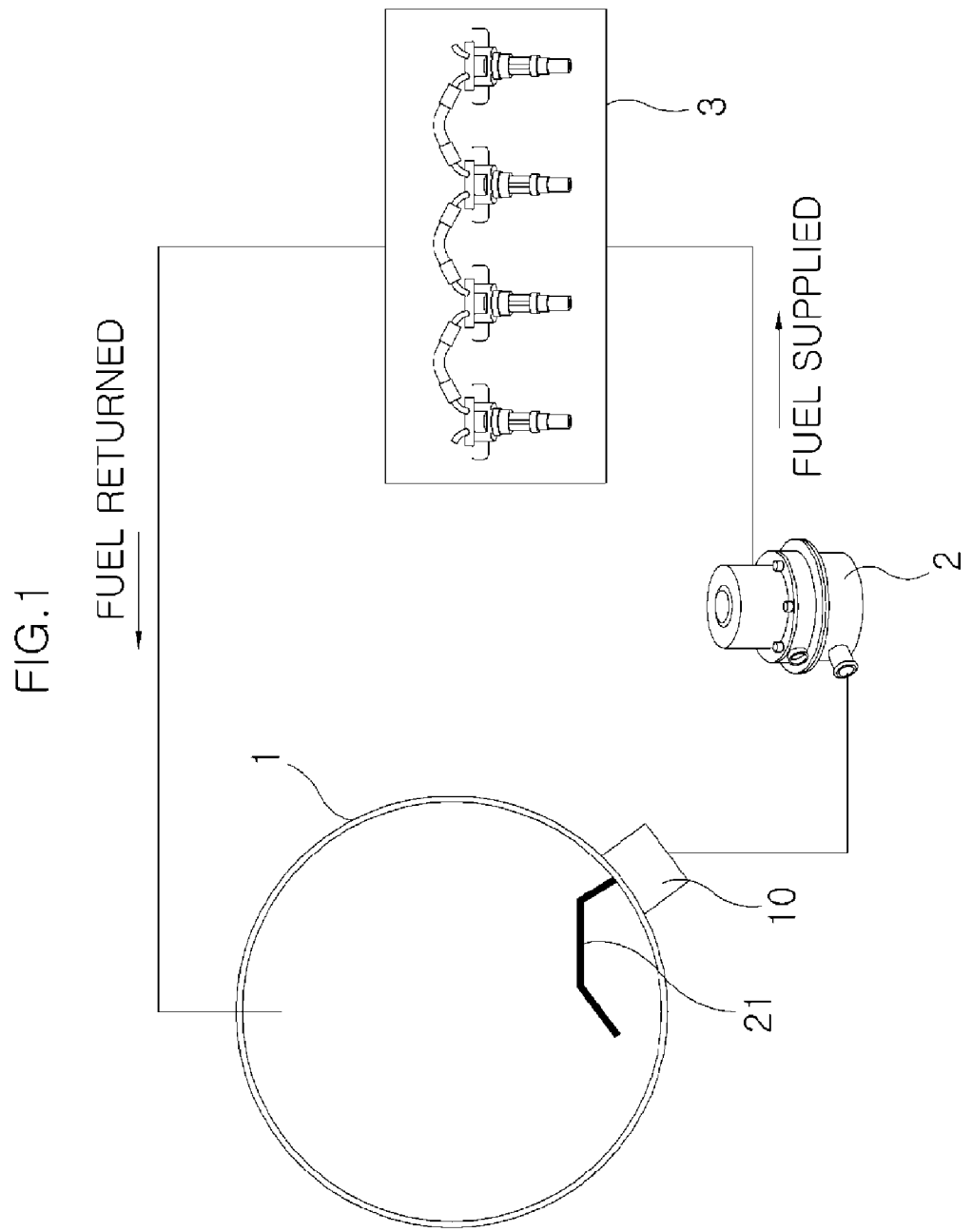
FIG. 1 is a schematic view showing the configuration of an exemplary LPI system.
Figure 2:
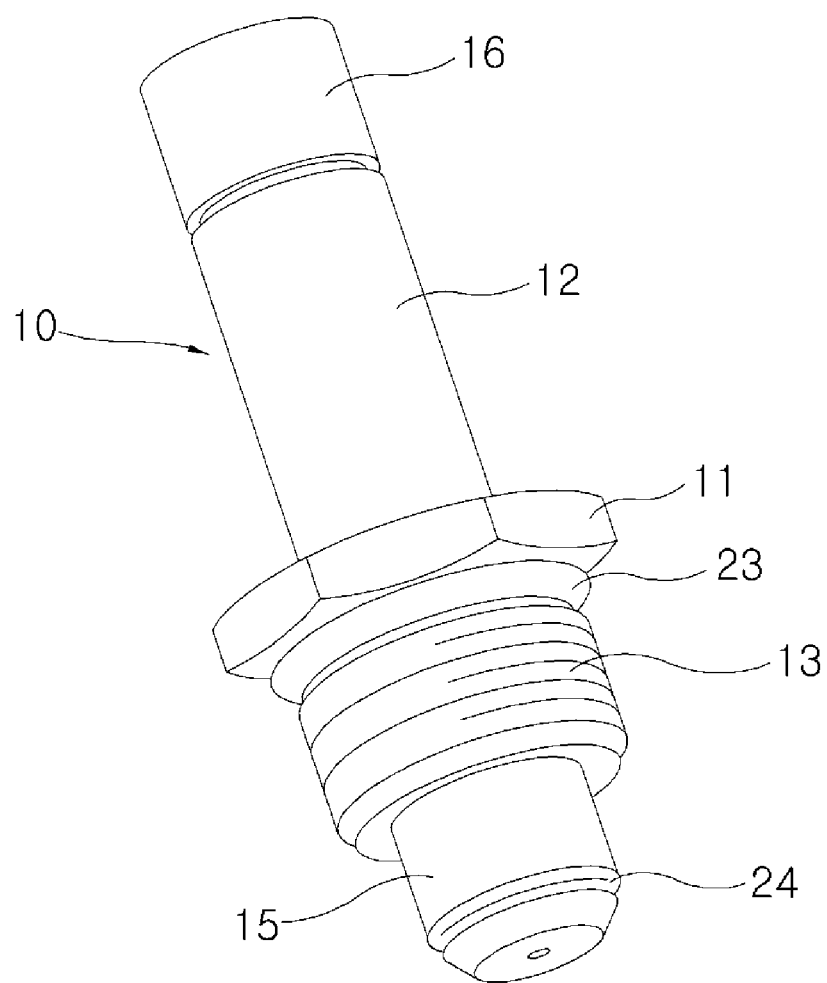
FIG. 2 is a perspective view showing a solenoid valve that is used for an LPI system in the related art.
Figure 3:
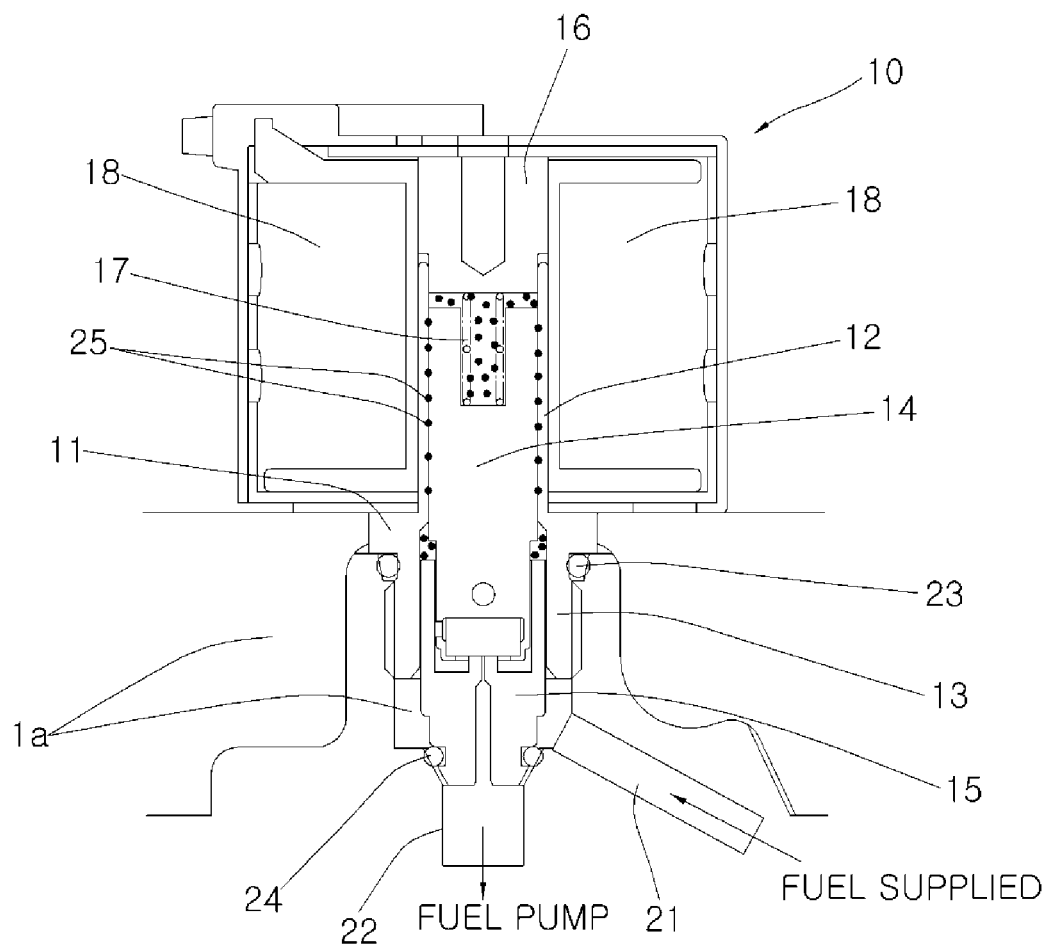
FIG. 3 is a cross-sectional view showing when a solenoid valve of the related art is mounted in a bomb housing.
Figure 4:
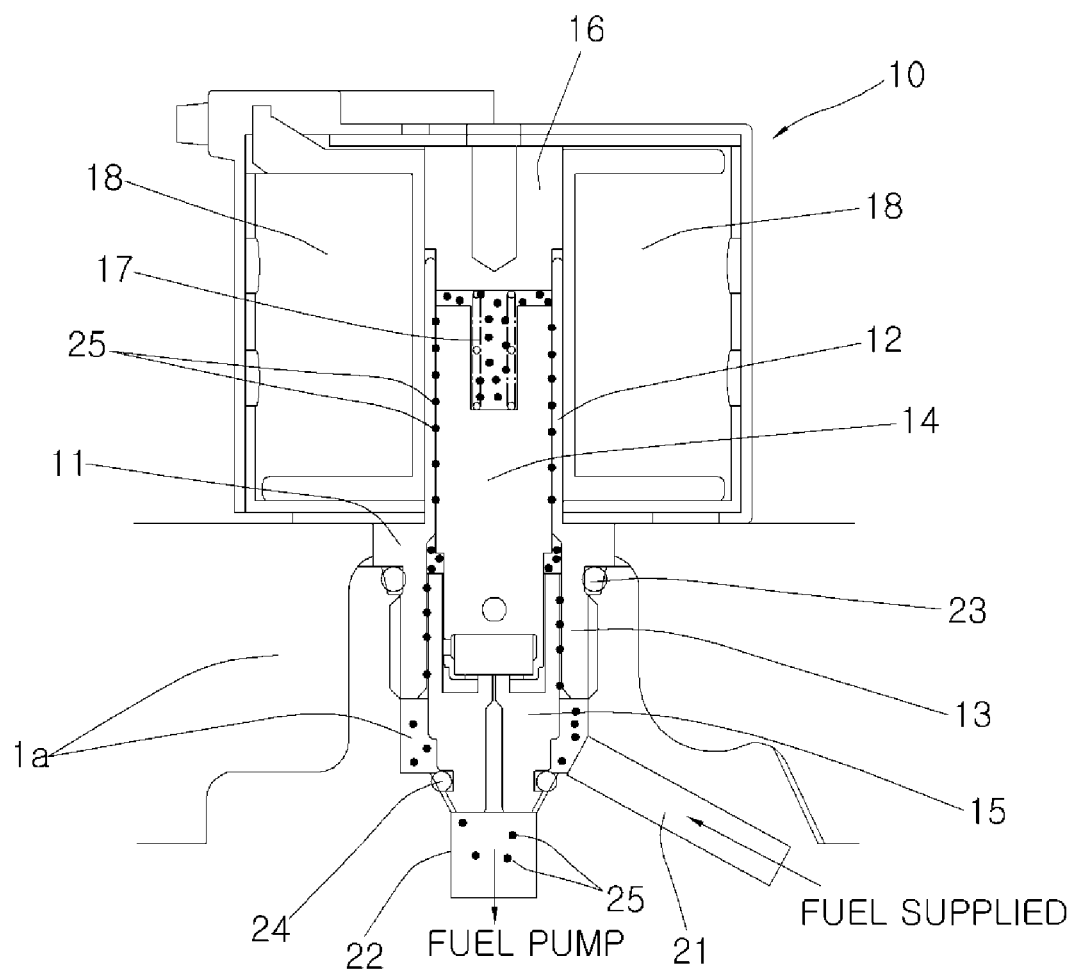
FIG. 4 is a view showing that bubbles produced by heat from a solenoid coil flow into a fuel pump through a fuel discharge channel, when a vehicle traveling at low speed is instantaneously and rapidly accelerated.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 5:
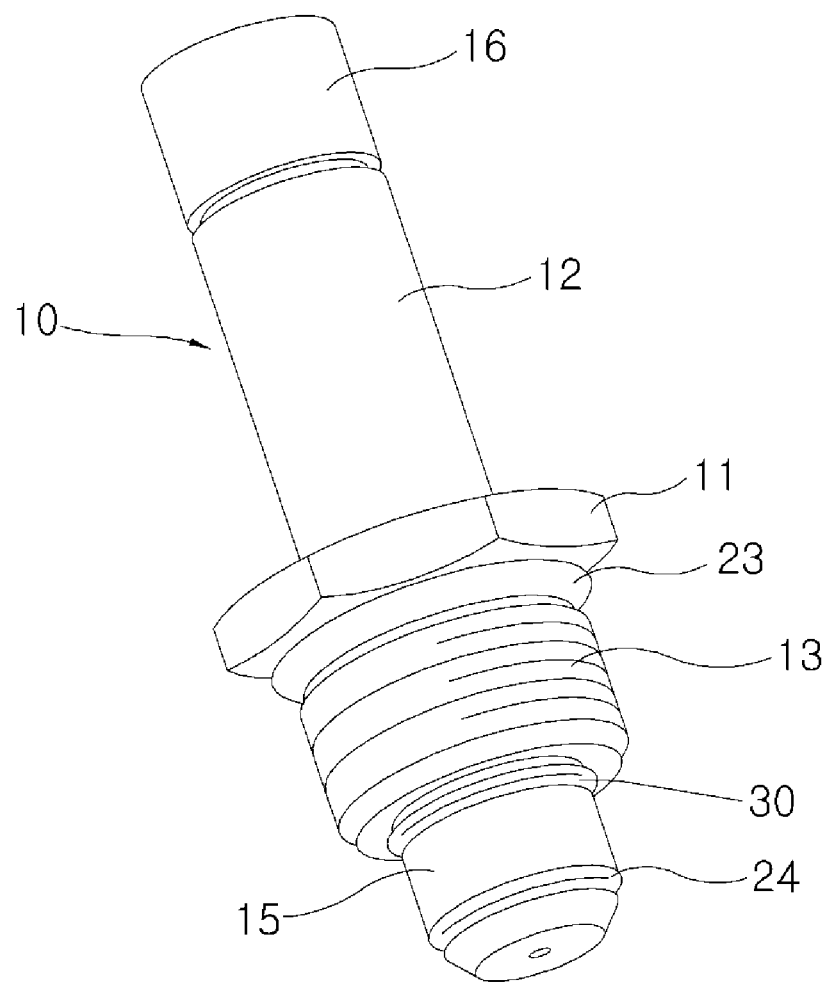
FIG. 5 is a perspective view showing an exemplary solenoid valve equipped with a sealing member according to the present invention.

A solenoid valve 10 for an LPI (Liquid Propane Injection) system, as shown in FIGS. 5 and 6, has a plunger housing 12 at one side from a tool-coupling portion 11 and a bomb-coupling portion 13 at the other side. A plunger 14 is inserted in plunger housing 12 and a pressure valve 15 is disposed in bomb-coupling portion 13, in which one end of pressure valve 15 is connected with plunger 14 and the other end is exposed to the outside through bomb-coupling portion 13.

In this structure, a thread is formed on the outer circumferential surface of bomb-coupling portion 13, such that bomb-coupling portion 13 is thread-fastened to a bomb housing 1a.

When bomb-coupling portion 13 is thread-fastened to bomb housing 1a, pressure valve 15 protruding through bomb-coupling portion 13 is positioned between a fuel intake port 21 and a fuel discharge port 22.

In solenoid valve 10, an armature 16 is connected to plunger housing 12 and a spring 17 elastically supporting plunger 14 is disposed between plunger 14 and armature 16, such that armature 16 fixes a solenoid coil 18 wound on plunger housing 12.

Further, an O-ring 23 keeping bomb housing 1a hermetic is disposed between tool-coupling portion 11 and bomb-coupling portion 13 and an O-ring 24 keeping fuel discharge port 22 hermetic is disposed on the outer circumferential surface of the end of pressure valve 15.

Solenoid valve 10 according to various embodiments of the present invention further includes a sealing member 30 that is fitted on the outer circumferential surface of pressure valve 15 which is connected with bomb-coupling portion 13 to prevent connection between the gap, which is in between bomb-coupling portion 13 and pressure valve 15, and the outside; and a sealing-reinforcing member 40 that is integrally formed in contact with sealing member 30 at the end of bomb-coupling portion 13 which faces sealing member 30 in order to reinforce airtightness between bomb-coupling portion 13 and sealing member 30.

In this structure, sealing member 30 has an L-shaped cross-section constructed by a vertical portion 31 and a horizontal portion 32, which are integrally connected and may be monolithically formed, and sealing-reinforcing member 40 has a triangular cross-section.

An upper edge of vertical portion 31 is in contact with an inner inclined surface 13a at the end of bomb-coupling portion 13 and horizontal portion 32 is in contact with the point of sealing-reinforcing member 40, in sealing member 30.

As sealing member 30 is arranged, as described above, an upper chamber 51 is hermetically formed by inner inclined surface 13a of bomb-coupling portion 13, the outer circumferential surface of pressure valve 15, and the top of vertical portion 31, while a lower chamber 52 is hermetically formed under upper chamber 51 by inner inclined surface 13a of bomb-coupling portion 13, the outer circumferential surface of vertical portion 31, and the top of horizontal portion 32.

A double hermetic structure is achieved by upper chamber 51 and lower chamber 52, such that the gap between bomb-coupling portion 13 and pressure valve 15 is never connected with the outside.

According to various embodiments of the present invention, sealing member 30 may be made of rubber, particularly, an O-ring made of rubber, but is not limited thereto.

Further, sealing-reinforcing member 40 may be made of the same material as bomb-coupling portion 13, for example, steel or plastic having predetermined strength, but is not limited thereto.

Solenoid valve 10 having the configuration described above keeps open such that fuel supply port 21 and fuel discharge port 22 are connected, by receiving power from a battery when the engine starts.

Bubbles 25 are produced by evaporation of the fuel in solenoid valve 10 that is operated by the power from the battery because the temperature of solenoid coil 18 that generates heat is higher than the temperature of the fuel, and bubbles 25 produced as described above remain in the gap between plunger housing 12 and plunger 14, as shown in FIG. 6.

Since the flow speed of the fuel is lows when a vehicle travels at low speed, bubbles 25 keep remaining in the gap between plunger housing 12 and plunger 14 and do not flow into fuel pump 2, while the flow speed of the fuel rapidly increases when the vehicle that has traveled for a predetermined time at low speed is instantaneously accelerated, such that bubbles 25 flow to fuel discharge port 22.

However, since various embodiments of the present invention have the structure that completely prevents the gap between plunger housing 12 and plunger 14 from being connected with the outside, by using sealing member 30 and sealing-reinforcing member 40, bubbles 25 in the gap between plunger housing 12 and plunger 14 cannot flow to fuel discharge port 22 and keep remaining in the gap between plunger housing 12 and plunger 14.

Accordingly, since various embodiments of the present invention make it possible to basically prevent bubbles 25 from flowing into fuel pump 2 when a vehicle traveling at low speed is instantaneously and rapidly accelerated, it is possible to prevent decrease in fuel-sending performance of fuel pump 2. Therefore, it is possible to smoothly supply fuel to injectors 3 and the vehicle can keep stably traveling.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A solenoid valve for a liquid propane injection system, comprising:
   a sealing member fitted on an outer circumferential surface of a pressure valve which is connected with a bomb-coupling portion to prevent a gap in between the bomb-coupling portion and the pressure valve from connecting to the atmosphere; and
   a sealing-reinforcing member integrally formed with the bomb-coupling portion and at an end of the bomb-coupling portion which faces the sealing member, the sealing-reinforcing member in contact with the sealing member to reinforce airtightness between the bomb-coupling portion and the sealing member;
   wherein the sealing member has an L-shaped cross-section including a vertical portion and a horizontal portion, which are integrally connected, the sealing-reinforcing member has a triangular cross-section, an upper edge of the vertical portion of the sealing member is in line contact with an inner inclined surface at the end of the bomb-coupling portion, and the horizontal portion of the sealing member is in line contact with an angular point of the sealing-reinforcing member.

2. The solenoid valve as defined in claim 1, wherein the horizontal portion of the sealing member is in contact with a point of the sealing-reinforcing member.

3. The solenoid valve as defined in claim 1, wherein the sealing member is made of rubber.

4. The solenoid valve as defined in claim 1, wherein the sealing member is an O-ring made of rubber.

5. The solenoid valve as defined in claim 1, wherein the sealing-reinforcing member and the bomb-coupling portion are made of the same material.

* * * * *